United States Patent [19]

Marks

[11] 4,033,223

[45] July 5, 1977

[54] QUICK SET ADJUSTABLE FASTENER

[75] Inventor: Steven L. Marks, Alpine, N.J.

[73] Assignee: Kettering Toys, Inc., Englewood Cliffs, N.J.

[22] Filed: July 26, 1976

[21] Appl. No.: 708,294

[52] U.S. Cl. .................................. 85/83; 85/1 P; 151/7

[51] Int. Cl.² ..................................... F16B 13/06

[58] Field of Search .......... 85/83, 82, 5 R, DIG. 2, 85/1 P, 44, 45, 41, 10 E, 36; 151/7, 41.73; 24/217 R, 208 A

[56] References Cited

UNITED STATES PATENTS

| | | | |
|---|---|---|---|
| 2,775,916 | 1/1957 | Baxter et al. | 85/DIG. 2 |
| 2,785,453 | 3/1957 | Wentz | 85/82 X |
| 2,833,325 | 5/1958 | Laisy | 85/45 X |
| 2,849,201 | 8/1958 | Schelgunov | 85/82 X |
| 2,876,485 | 3/1959 | Cowles | 85/82 X |
| 2,882,780 | 4/1959 | Edwards | 85/5 R |
| 3,054,321 | 9/1962 | Macchia | 85/9 R |
| 3,434,521 | 3/1969 | Flora | 85/83 X |
| 3,865,006 | 2/1975 | Massoney | 85/44 |

FOREIGN PATENTS OR APPLICATIONS

| | | | |
|---|---|---|---|
| 46-16203 | 5/1971 | Japan | 85/41 |
| 823,461 | 11/1959 | United Kingdom | 85/44 |

Primary Examiner—Ramon S. Britts

[57] ABSTRACT

A quick set adjustable fastener which includes a plastic sleeve having a smooth bore for receiving a threaded or grooved fastener whereby the connection between the sleeve and fastener is attained by pushing the fastener into the bore of the sleeve and whereby adjustment is attained by rotation of the fastener relative to the sleeve.

2 Claims, 5 Drawing Figures

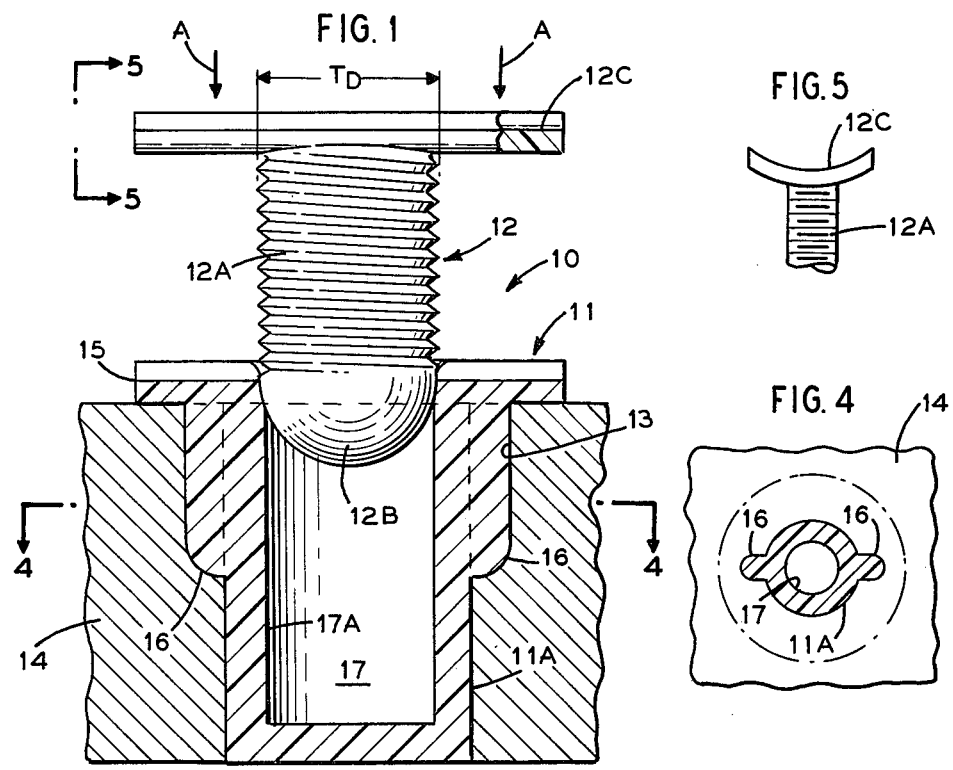
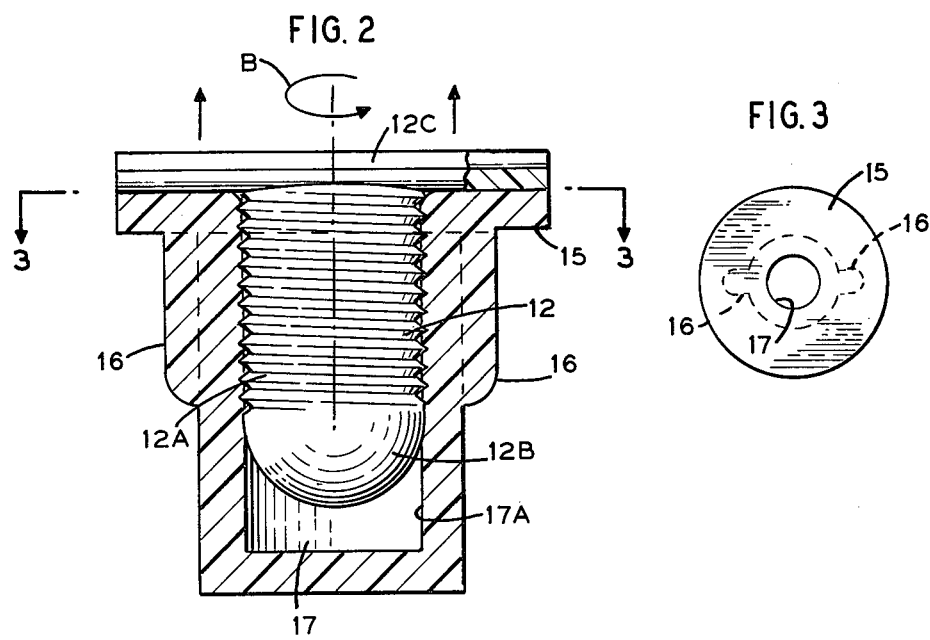

QUICK SET ADJUSTABLE FASTENER

PROBLEM & PRIOR ART

Heretofore, many efforts have been made to improve fasteners and/or to develop fasteners for various specific application. In the toy and display arts, it is frequently necessary that associated component parts be fastened together by screw type fasteners. However, in the assembly of such component parts with screw type fasteners, it has been noted that a considerable amount of time is required to thread a screw into its complementary nut. Where many such fastening operations are required, the time required to effect the fastening of the parts is compounded accordingly. Also in the toy and display arts it is frequently necessary that screw type fasteners be utilized to effect an adjustment between component parts, while at the same time maintaining such parts connected.

Objects

An object of this invention is to provide a fastener which can be quickly made with a minimum of effort.

Another object is to provide a fastener which can be quickly assembled and which can be adjusted in a manner whereby the adjusted position can be self-sustained.

Another object is to provide a quick set fastener which is relatively simple in construction, can be readily made, and which is inexpensive.

BRIEF DESCRIPTION OF THE INVENTION

The foregoing objects and other features and advantages are attained by a fastening device which includes a sleeve formed of a plastic material, e.g., Nylon which is provided with a smooth bore and which is adapted to accommodate a threaded or grooved fastener or screw whereby the screw is frictionally secured to the sleeve by merely pushing the screw fastener into the bore of the sleeve. Adjustment of the screw fastener relative to the sleeve is attained by backing off the screw fastener by rotation if the screw fastener was inserted too deeply into the sleeve.

Features

A feature of this invention resides in the provision of a plastic sleeve having a smooth bore sized to accommodate the shank of a screw type fastener wherein the assembly of the screw to the sleeve is attained by simply pushing the screw type fastener into the bore of the sleeve to a desired depth.

Another feature of the invention resides in the provision whereby adjustment of the screw relative to the sleeve can be effected by rotation of the screw relative to the sleeve.

Another feature resides in the provision wherein the screw fastener is required to be unscrewed from the sleeve to disassemble, whereas fastening of the screw to the sleeve is effected by simply pushing the screw into the bore of the sleeve.

Other features and advantages will become more readily apparent when considered in view of the drawings and description in which:

FIG. 1 is a sectional view of the fastening device embodying the present invention illustrating the screw fastener as it is about to be attached to the sleeve.

FIG. 2 illustrates the component parts of the fastening device in fully assembled position.

FIG. 3 is a top plan view of the sleeve portion of the fastening device.

FIG. 4 is a section view taken along line 4—4 on FIG. 1.

FIG. 5 is a detail sectional view of the screw fastener taken along line 5—5 on FIG. 1.

DETAILED DESCRIPTION

Referring to the drawings there is shown a fastening device 10 embodying the present invention. As shown, the fastening device includes a sleeve nut 11 and a screw type fastener 12. The sleeve nut 11 has a body portion 11A which is adapted to be inserted into a hole 13 which is formed in a workpiece 14. The illustrated sleeve nut 11 is provided with a flange 15 circumscribing the upper end portion thereof. Lateral extending wing protuberants 16 may be disposed to either side of the body portion 11A, and function to prevent rotation of the sleeve nut 11 when placed in a workpiece 14. In accordance with this invention, the sleeve nut 11A is formed of a suitable plastic material, e.g., Nylon and the like, which has a certain elasticity and lubricant properties, for reasons hereinafter set forth. Formed in the body 11A is a bore 17 which has smooth wall surfaces 17A.

The fastener 12 is illustrated as a screw type fastener having a shank portion 12A which is threaded. The tip end of the shank 12A is formed with an enlarged head 12B which is rounded as shown. The diameter of the enlarged head 12B is slightly greater than the internal diameter of the sleeve bore 17 and substantially equal to the thread diameter TD. Connected to the upper end of the shank 12 is a screw head 12C which in the illustrated embodiment is shown as an arcuate shaped cross head.

In operation, the screw fastener 12 can be quickly assembled to the sleeve nut 11 by merely aligning the shank 12A of the screw fastener with the bore 17 of the sleeve nut 11 and applying force or pushing on the head end of the screw 12 in the direction of arrows A. In doing so the enlarged head end 12B of the fastener exerts a lateral force on the walls of the sleeve nut. Because of the inherent resiliency of the sleeve nut material, sufficient displacement is permitted so that the shank of the fastener can be readily inserted within the bore without the time consumming threading of the screw to the sleeve nut. As the head end 12C of the fastener is advanced into the bore 17, the portion of the sleeve body immediately following the head, due to the resiliency of the sleeve material, will close onto the threading of the screw shank as seen in FIG. 2 to firmly secure the screw fastener to the sleeve nut.

The assembly of the screw type fastener 12 to the sleeve nut 11 is attained simply by a pushing action. Thus, the screw fastener can be axially set to any desired position by pushing the shank into the bore a predetermined distance by pushing the shank into the bore a predetermined distance. If for some reason it is desired to adjust the position of the fastener, or to back the fastener out of the bore 17, the fastener is rotated relative to the sleeve nut 11 as indicated by arrow B. Thus the screw fastener is removed by unscrewing the fastener.

It will be understood that the screw fastener may also be made of plastic material, e.g., Nylon, or it can be made of metal or other suitable material.

While the present invention has been described as to a specific embodiment thereof, it will be understood that variations and modifications may be made without departing from the spirit or scope of the invention.

What is claimed is:

1. A quick set adjustable fastening device comprising:

a sleeve unit adapted to be held in a hole formed in a workpiece, said sleeve nut having a smooth wall bore, the wall of said bore being formed of a resilient plastic material, a screw fastener, said screw fastener having an externally shank portion to be received in said bore, said shank having a rounded tip end portion, said rounded tip end portion having a diameter slightly greater than the internal diameter of said bore and substantially equal to the thread crest diameter of said shank, whereby said screw fastener is assembled to said sleeve by pushing the shank of said fastener into said bore.

2. A quick set adjustable fastening device comprising:

a sleeve nut adapted to be held in a workpiece, said sleeve nut having a body portion with a smooth wall bore formed therein, a circumscribing flange adjacent one end of said body portion, opposed protuberances disposed externally of said body portion below said flange, said sleeve nut being formed of a resilient plastic material, a screw fastener, said screw fastener having an externally threaded shank portion, and a cross head connected to said shank at one end thereof, said shank terminated in an enlarged rounded tip at its other end, said enlarged tip end having a diameter slightly greater than the internal diameter of said bore and substantially equal to the thread crest diameter of said shank, whereby said enlarged tip end defines a guide for expanding the walls of the bore immediately in advance of the threads on said shank so that the fastener is secured to the nut without rotation of the threaded shank.

* * * * *